United States Patent
Hill

(10) Patent No.: US 10,035,452 B2
(45) Date of Patent: Jul. 31, 2018

(54) TIE-DOWN WRAP DEVICE FOR SECURING LOADS AND METHODS OF USE

(71) Applicant: Jerry Hill Innovations, Inc., Chassell, MI (US)

(72) Inventor: Jerry R. Hill, Chassell, MI (US)

(73) Assignee: Jerry Hill Innovations, Inc., Chassell, MI (US)

( * ) Notice: Subject to any disclaimer, the term of this patent is extended or adjusted under 35 U.S.C. 154(b) by 0 days.

(21) Appl. No.: 15/548,087

(22) PCT Filed: Aug. 22, 2015

(86) PCT No.: PCT/US2015/046434
§ 371 (c)(1),
(2) Date: Aug. 1, 2017

(87) PCT Pub. No.: WO2017/034532
PCT Pub. Date: Mar. 2, 2017

(65) Prior Publication Data
US 2018/0029519 A1    Feb. 1, 2018

(51) Int. Cl.
*B60P 7/08* (2006.01)
*B60P 3/079* (2006.01)

(52) U.S. Cl.
CPC ............. *B60P 7/0823* (2013.01); *B60P 3/079* (2013.01)

(58) Field of Classification Search
CPC ..... B60P 7/0823; B60P 7/0807; B60P 7/0846; B60P 3/079; B60P 3/075; B60P 3/40
(Continued)

(56) References Cited

U.S. PATENT DOCUMENTS 63,510 A    4/1867  Hall
487,145 A   11/1892  Gibbons
(Continued)

FOREIGN PATENT DOCUMENTS

KR    10-2009-0092772    9/2009

OTHER PUBLICATIONS

International Search Report for PCT/US2015/046434, dated Apr. 25, 2016 (3 pages).
(Continued)

*Primary Examiner* — Darrell G Dayoan
*Assistant Examiner* — Sunsurraye Westbrook
(74) *Attorney, Agent, or Firm* — Terrence M. Wyles, Esq.; Startup IP Law, LLC

(57) ABSTRACT

The inventive disclosure is generally directed to an improved tie-down/anchor-point/attachment-point wrap device that can be used for heavy loads and/or shipping of articles in conjunction with various securing mediums such as a bungee cords, tie-down straps, ropes, etc. Each device features an easily changeable, yet securely coupled and pivotable, hardware-attachment point; two parallel strips of heavy-duty webbing for load-bearing that is reinforced with a plurality of high-surface-friction (that is, "gripping") substrates stitched to the webbing; and reinforcing substrates that include the mating surfaces for a hook-and-loop coupling to secure the device in place when wrapped-around a structural member, with a longitudinal space disposed between the strips of webbing and reinforcing substrates to allow a pivotable connector to extend through when installed on a structural member, and a backup securement loop for the hardware-attachment point.

50 Claims, 4 Drawing Sheets

(58) Field of Classification Search
USPC ....... 410/110, 97, 6, 116, 100, 101, 103, 23, 410/102, 105, 98; 602/12, 20, 21, 23, 3, 602/60, 61, 662, 63, 75

See application file for complete search history.

(56) References Cited

U.S. PATENT DOCUMENTS

| | | |
|---|---|---|
| 1,514,962 A | 11/1924 | Emil |
| 1,945,932 A | 2/1934 | Caley |
| 2,971,231 A | 2/1961 | Stoddard |
| 3,279,008 A | 10/1966 | Wallach |
| 3,365,753 A | 1/1968 | Prenner et al. |
| 3,855,670 A | 12/1974 | Brudy |
| 3,965,539 A | 6/1976 | Golden |
| 3,994,048 A | 11/1976 | Rosenthal |
| 4,015,762 A | 4/1977 | Mendillo |
| 4,088,136 A | 5/1978 | Hasslinger et al. |
| 4,431,226 A | 2/1984 | Weilert |
| 4,982,522 A | 1/1991 | Norton |
| 5,008,987 A | 4/1991 | Armour, II |
| 5,014,890 A | 5/1991 | Perry |
| 5,075,933 A | 12/1991 | Kemper |
| 5,104,076 A | 4/1992 | Goodall, Jr. |
| 5,168,603 A | 12/1992 | Reed |
| 5,177,986 A | 1/1993 | Jensen |
| 5,603,591 A | 2/1997 | McLellan |
| 5,732,445 A | 3/1998 | Stodolka |
| 5,745,958 A | 5/1998 | Kaldor |
| 5,774,948 A | 7/1998 | Petschkle et al. |
| D401,137 S | 11/1998 | Boelling |
| 5,870,849 A | 2/1999 | Colson, Jr. |
| 5,882,320 A | 3/1999 | Peterson |
| 5,943,963 A | 8/1999 | Beals |
| 5,957,141 A | 9/1999 | Elkins |
| 6,029,321 A | 2/2000 | Fisher |
| 6,113,328 A | 9/2000 | Claucherty |
| 6,145,715 A | 11/2000 | Slonim |
| 6,183,178 B1 | 2/2001 | Bateman |
| 6,199,412 B1 | 3/2001 | Kennedy |
| 6,231,285 B1 | 5/2001 | Elwell et al. |
| 6,244,800 B1 | 6/2001 | Studanski |
| 6,256,844 B1 | 7/2001 | Wheatley |
| 6,290,440 B1 | 9/2001 | DiVaccaro |
| 6,317,933 B1 | 11/2001 | Suenaga |
| 6,394,720 B1 | 5/2002 | McCay |
| 6,430,784 B1 | 8/2002 | Dudek et al. |
| 6,447,037 B1 | 9/2002 | Crouch |
| 6,449,816 B1 | 9/2002 | Dudek et al. |
| 6,606,768 B2 | 8/2003 | Henry et al. |
| 6,622,346 B2 | 9/2003 | Graham et al. |
| 6,631,539 B1 | 10/2003 | Chang |
| 6,637,079 B1 | 10/2003 | Goulait et al. |
| 6,701,580 B1 | 3/2004 | Bandyopadhyay |
| 6,767,169 B2 | 7/2004 | Zhan et al. |
| 6,802,109 B2 | 10/2004 | Hede et al. |
| 7,171,731 B1 | 2/2007 | Borcherding |
| 7,219,405 B1 | 5/2007 | Nevens |
| 7,322,780 B2 | 1/2008 | Hill |
| 7,484,273 B1 | 2/2009 | Dupree et al. |
| 7,587,796 B1 | 9/2009 | Schultz |
| 7,624,480 B2 | 12/2009 | Coronel |
| 7,743,735 B2 | 6/2010 | Weinberg |
| 7,854,042 B2 | 12/2010 | Richardson |
| 7,895,716 B2 | 3/2011 | Taillon et al. |
| 8,210,405 B1 | 7/2012 | Pritchard |
| D675,023 S | 1/2013 | Colgan |
| 8,371,000 B1 | 2/2013 | Schultz |
| 8,458,864 B1 | 6/2013 | Patton et al. |
| 8,628,488 B2 | 1/2014 | Serola |
| D728,806 S * | 5/2015 | Cox .................... D24/190 |
| 9,339,086 B2 | 5/2016 | Hill |
| 9,635,925 B2 * | 5/2017 | Moreau .................... A45F 5/00 |
| 2001/0047607 A1 * | 12/2001 | Harvanek .................... A01K 97/06 43/21.2 |
| 2002/0092138 A1 | 1/2002 | Spiller |
| 2005/0081798 A1 | 4/2005 | Munroe |
| 2006/0032032 A1 | 2/2006 | Cheng |
| 2006/0122547 A1 * | 6/2006 | Stewart, III .................... A61F 5/028 602/19 |
| 2006/0143875 A1 | 7/2006 | Kunold |
| 2007/0086873 A1 | 4/2007 | Rivera |
| 2007/0196193 A1 | 8/2007 | Hill |
| 2008/0235871 A1 | 10/2008 | York |
| 2009/0241300 A1 | 10/2009 | Ferguson |
| 2010/0175233 A1 | 7/2010 | Breeden et al. |
| 2010/0257703 A1 | 10/2010 | Vass |
| 2010/0319167 A1 | 10/2010 | Nirmel |
| 2012/0023711 A1 | 2/2012 | Neumann et al. |
| 2012/0180268 A1 | 7/2012 | Chen |
| 2014/0182084 A1 | 7/2014 | Hill |
| 2015/0217674 A1 * | 8/2015 | Hart .................... B60P 7/0823 24/302 |
| 2016/0095421 A1 * | 4/2016 | Moreau .................... A45F 5/00 248/341 |

OTHER PUBLICATIONS

Written Opinion of the International Searching Authority for PCT/US2015/046434, dated Apr. 25, 2016 (7 pages).
www.amazon.com/Ancra-40880-10-Red-Original-Down/dp/B000GU2008/ref: Ancra 40880 Red Original Tie Die advertised on Amazon.com: Automotive.
www.amazon.com/Soft-Loop-Tie-Down Straps/dp/B002MYLB1Y/ref: (4) Soft Loop Tie-Down Straps advertised on Amazon.com : Sports & Outdoors.
www.amazon.com/Keeper-Extension-Tie-Down-break-strength/dp/B000CODH0O/ref: Keeper 5729 16" Soft Tie Extension Tie-Down, 800 lbs. WLL (2500 lbs. break strength) 4 pk.—Advertised on amazon.com.

* cited by examiner

TIE-DOWN WRAP DEVICE FOR SECURING LOADS AND METHODS OF USE

BACKGROUND

The present inventive disclosure relates to load-retaining devices and particularly to retaining devices that are useful for stabilizing articles for shipment or storage and for securing articles in place by attaching one or more cables, ropes, chains, or straps.

While various retainers have been previously proposed, most prior devices are not suited for tying down a wide variety of articles that are to be shipped such as metal tubing, rod or pole stock, boards, or even vehicles such as motorcycles, bicycles, snowmobiles, all-terrain vehicles, and the like. The Inventor and Applicant of the present patent application is also the Inventor and Patentee of one previous solution; that is, the tie-down devices disclosed in U.S. Pat. No. 7,322,780, issued on Jan. 29, 2008 for "Tie-Down Wrap Device for Securing Articles for Shipment" (hereinafter, "the '780 Patent"), the teachings of which are hereby incorporated by reference. While the '780 Patent did present a significant step forward in load-securing devices, among its deficiencies are the inability to easily replace the connector hardware (e.g., from a clip hook to an open hook or to a closed "eye" type of connector) while also being able to maintain a secure coupling when loads are applied. The connector-hardware-attachment configuration of the '780 Patent employs a connector-retaining substrate that has an opening for an orthogonally placed hardware connector to extend through, with the connector-retaining substrate being secured by a couple of snaps. The '780 Patent device further requires a discrete opening in the balance of the wrap device that will correspond to the connector hardware extension as it is wrapped tightly and securely around some sort of bar, beam, or other anchor point. The problem here is that the design of the '780 Patent's device generally requires a specific size of anchor point so that the aforementioned discrete opening can correspond to the extended connector hardware while still being securely wrapped around the user's selected anchor point. This makes it desirable to improve the design to make the device more robust and adaptable to different applications.

In addition, while some embodiments of the '780 Patent purport to allow for some pivtability of the included connector hardware, the reality is that between the limited size of the openings for the extended connector hardware, and the generally secure orthogonal orientation of the installation of the connector hardware relative to the wrap device's substrates, the movability/pivotability of the connector hardware is very limited, which can present a problem for riggers as a the tie-wrap devices realize increasing/shifting loads and stresses.

Further, many tie-down wrap devices employ some sort of hook-and-loop coupling to secure the wrapping position. However, over time, and especially after repeated uses, hook-and-loop coupling can get fouled with foreign materials making their coupling less secure. Accordingly, what would be advantageous is a retaining device that anticipates this possibility and provides some sort of backup to hold onto connector hardware in the event of the failure of a hook-and-loop coupling on the wrap device.

What is needed is an improved retaining device that eliminates the issues discussed above, while still providing a solution that can be widely applied to the support, stabilization, and/or tying-down of articles, and that can be used both by shipping companies as well as by non-commercial consumers for tying-down articles/equipment; e.g., in the bed of a pick-up truck or trailer that is hauled behind an automobile, SUV, or truck. In commercial use, the improved retaining device should be suited for tying-down articles that are shipped by truck, train, flatbed, or semi-trailer, etc.

BRIEF SUMMARY

The present inventive disclosure is generally directed to an improved tie-down/anchor point/attachment point wrap device that can be used for heavy loads and/or shipping of articles in conjunction with various securing mediums such as a bungee cords, tie down straps, lanyards, ropes, netting, carabiners, webbing straps, chains, etc. The device has dozens of uses around the home, in construction, transportation, and recreation like boating, camping, and off-road activities—and no tools are required to install and use the device. In many embodiments, the devices are comprised of 100% polyester and the metal heads are made of stainless steel, and are rated for high loads in excess of 1300 lbs., and can be made/scaled in size to suit a variety of applications. In many variations, each device has an easily changeable, yet securely coupled, hardware attachment point (e.g., an eye-loop-type or hook-type connector) that includes a connector-receiving cavity and is pivotable to accommodate changing load conditions.

In many embodiments, the improved tie-down-wrap device is comprised of two parallel strips of heavy-duty webbing for load bearing that is reinforced with a plurality of high-surface-friction (that is, "gripping") substrates stitched to the webbing, as well as reinforcing substrates that include the mating surfaces for a hook-and-loop coupling to secure the device in place when wrapped around a structural member, with a longitudinal space disposed between the strips of webbing and the reinforcing substrates to allow a pivotable hardware connector to extend through when installed on a structural member. On one end of the device are a pair of webbing loops adapted to securely receive a hardware-connector's anchor members, yet allow the change-out/replacement of the user-selected connector hardware. Finally, the device also features a backup securement loop of webbing disposed at the aforementioned longitudinal space in order to provide a back means to secure the connector hardware's anchor members should the aforementioned pair of webbing loops and/or the hook-and-loop connection fails for some reason.

The foregoing Brief Summary is intended to merely provide a short, general overview of the inventive disclosure described throughout this document, and therefore, is not intended to limit the scope of the inventive disclosure contained throughout the balance of this document, including the appended claims and drawings.

DESCRIPTION

I. Overview

Figure 1A:
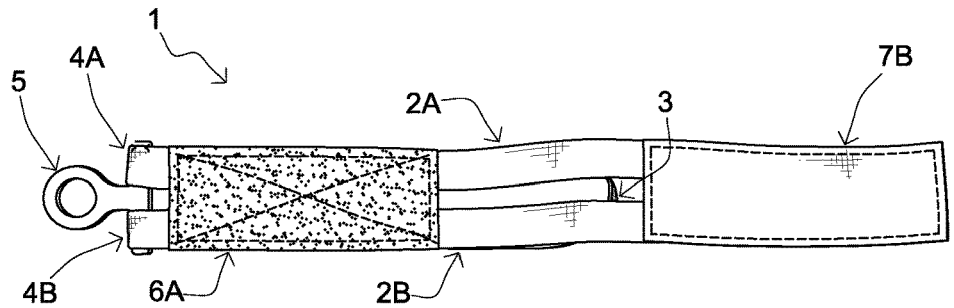
FIG. 1A depicts one embodiment of the unrolled, external side of an improved tie-down-wrap device for use as a tie-down, anchor point, and/or attachment point for heavy loads and/or shipping of articles.

The present inventive disclosure is generally directed to an improved tie-down/anchor point/attachment point wrap device that can be used for heavy loads and/or shipping of articles in conjunction with various securing mediums such as a bungee cords, tie down straps, lanyards, ropes, netting, carabiners, webbing straps, chains, etc. The device has dozens of uses around the home, in construction, transportation, and recreation like boating, camping, and off-road activities—and no tools are required to install and use the device. In many embodiments, the devices are comprised of 100% polyester and the metal heads are made of stainless steel, and are rated for high loads in excess of 1300 lbs., and can be made/scaled in size to suit a variety of applications. In many variations, each device has an easily changeable, yet securely coupled, hardware attachment point (e.g., an eye-loop-type or hook-type connector) that includes a connector-receiving cavity and is pivotable to accommodate changing load conditions.

In many embodiments, the improved tie-down-wrap device is comprised of two parallel strips of heavy-duty webbing for load bearing that is reinforced with a plurality of high-surface-friction (that is, "gripping") substrates stitched to the webbing, as well as reinforcing substrates that include the mating surfaces for a hook-and-loop coupling to secure the device in place when wrapped around a structural member, with a longitudinal space disposed between the strips of webbing and the reinforcing substrates to allow a pivotable hardware connector to extend through when installed on a structural member. On one end of the device are a pair of webbing loops adapted to securely receive a hardware-connector's anchor members, yet allow the change-out/replacement of the user-selected connector hardware. Finally, the device also features a backup securement loop of webbing disposed at the aforementioned longitudinal space in order to provide a back means to secure the connector hardware's anchor members should the aforementioned pair of webbing loops and/or the hook-and-loop connection fails for some reason.

II. Terminology

The terms and phrases as indicated in quotes (" ") in this Section are intended to have the meaning ascribed to them in this Terminology Section applied to them throughout this document, including the claims, unless clearly indicated otherwise in context. Further, as applicable, the stated definitions are to apply, regardless of the word or phrase's case, to the singular and plural variations of the defined word or phrase.

The term "or", as used in this specification and the appended claims, is not meant to be exclusive; rather, the term is inclusive, meaning "either or both".

References in the specification to "one embodiment", "an embodiment", "a preferred embodiment", "an alternative embodiment", "a variation", "one variation", and similar phrases mean that a particular feature, structure, or characteristic described in connection with the embodiment is included in at least an embodiment of the invention. The appearances of the phrase "in one embodiment" and/or "in one variation" and similar phrases in various places in the specification are not necessarily all meant to refer to the same embodiment.

The term "couple" or "coupled", as used in this specification and the appended claims, refers to either an indirect or a direct connection between the identified elements, components, or objects. Often the manner of the coupling will be related specifically to the manner in which the two coupled elements interact.

The term "removable", "removably coupled", "readily removable", "readily detachable", "detachably coupled", and similar terms, as used in this specification (including the claims and drawings), refer to structures that can be uncoupled from an adjoining structure with relative ease (i.e., non-destructively and without a complicated or time-consuming process) and that can also be readily reattached or coupled to the previously adjoining structure.

Directional and/or relational terms such as, but not limited to, left, right, nadir, apex, top, bottom, vertical, horizontal, back, front, lateral, proximal, and distal are relative to each other, are dependent on the specific orientation of an applicable element or article, are used accordingly to aid in the description of the various embodiments, and are not necessarily intended to be construed as limiting in this specification and the appended claims.

As applicable, the terms "about" or "generally", as used herein unless otherwise indicated, means a margin of +−20%. Also, as applicable, the term "substantially" as used herein unless otherwise indicated means a margin of +−10%. It is to be appreciated that not all uses of the above terms are quantifiable such that the referenced ranges can be applied.

III. An Improved Tie-Down-Wrap Device for Load Handling and/or Securement

This Section III is generally directed to embodiments of an improved tie-down-wrap device for use as a tie-down, anchor point, and/or attachment point for loads and/or shipping of articles. In many embodiments, the device is especially adapted for heavy-load applications.

Figure 1B:
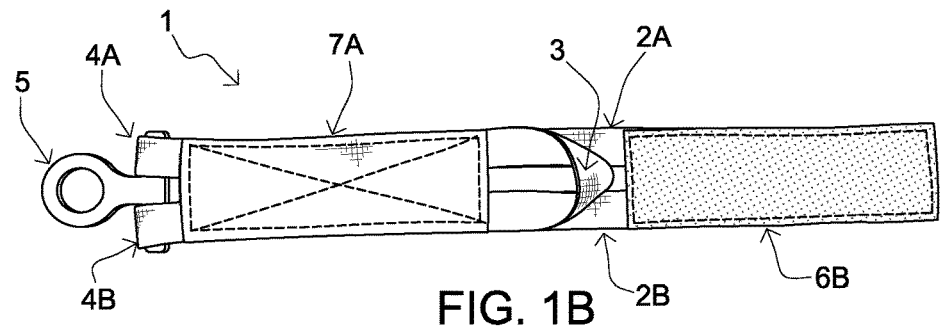
FIG. 1B depicts one embodiment of the unrolled, internal side of an improved tie-down-wrap device for use as a tie-down, anchor point, and/or attachment point for heavy loads and/or shipping of articles.
Figure 1C:
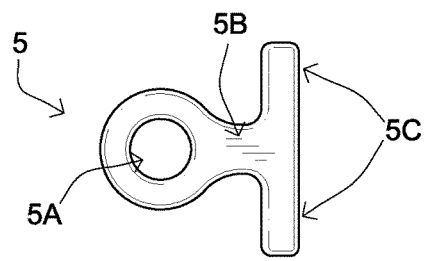
FIG. 1C depicts one embodiment of a load-tie-down member having a connector-receiving-cavity end featuring an enclosed "eye", a neck section, and two anchor flanges.
Figure 1D:
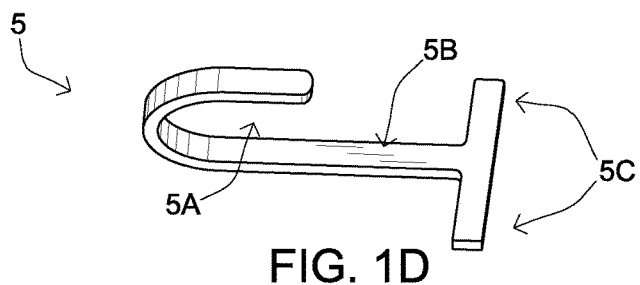
FIG. 1D depicts one alternative embodiment of a load-tie-down member having a connector-receiving-cavity end featuring a "hook", a neck section, and two anchor flanges.
Figure 1E:
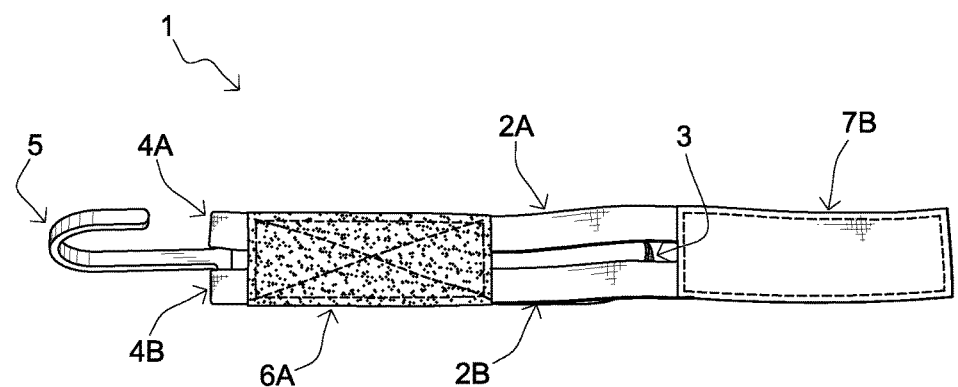
FIG. 1E depicts one alternative embodiment of the unrolled, external side of an improved tie-down-wrap device for use as a tie-down, anchor point, and/or attachment point for heavy loads and/or shipping of articles, wherein it features a hook-type load-tie-down member. The unrolled, internal side is not depicted, but has all of the same features as in FIG. 1B, other than having a different load-tie-down member.
Figure 2A:
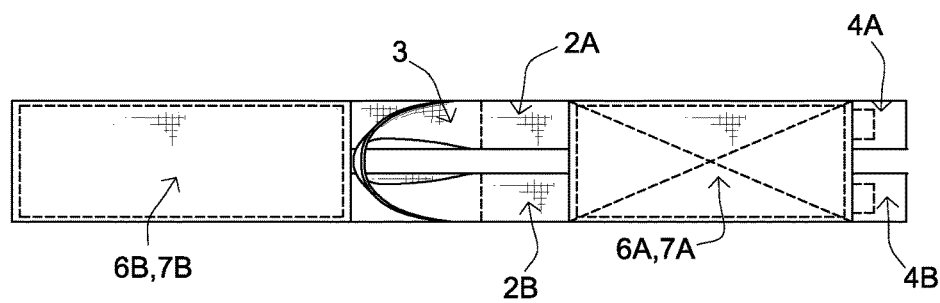
FIG. 2A depicts one embodiment of a top-plan view of the layout of the substrates for an improved tie-down-wrap device for use as a tie-down, anchor point, and/or attachment point for heavy loads and/or shipping of articles.
Figure 2B:
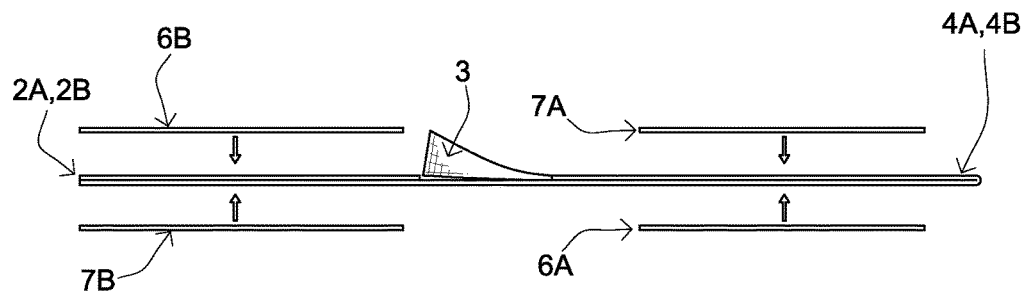
FIG. 2B depicts one embodiment of an exploded side-plan view of the layout of the substrates for an improved tie-down-wrap device for use as a tie-down, anchor point, and/or attachment point for heavy loads and/or shipping of articles.
Figure 3A:
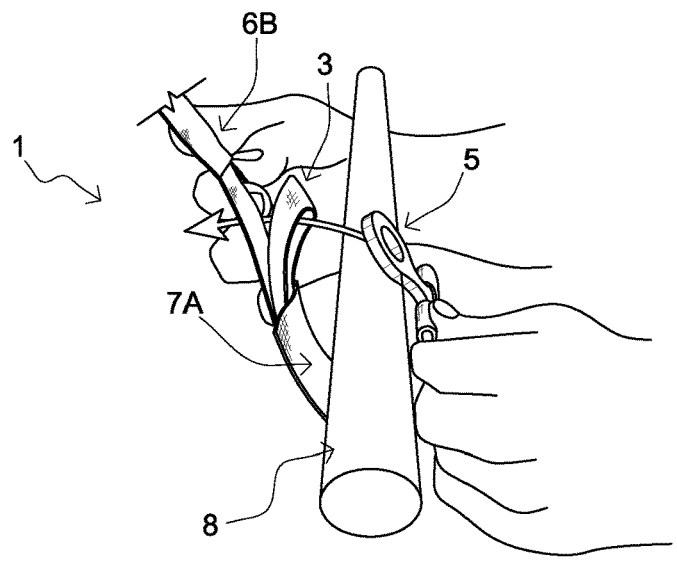
FIG. 3A depicts one embodiment of a user attachment of one embodiment of an improved tie-down-wrap device for use as a tie-down, anchor point, and/or attachment point for heavy loads and/or shipping of articles.
Figure 3B:
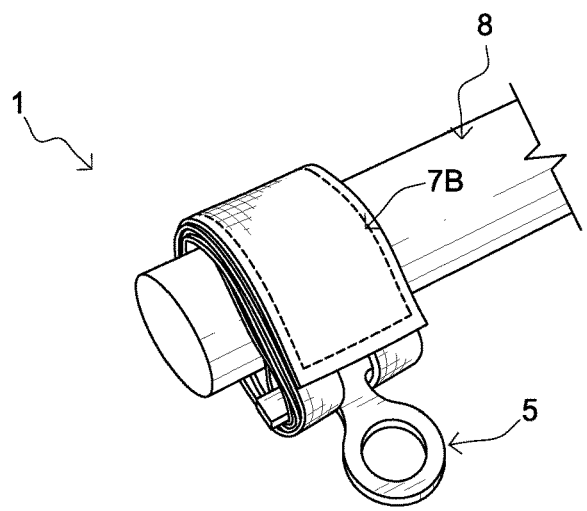
FIG. 3B depicts one embodiment of a completed user attachment of one embodiment of an improved tie-down-wrap device for use as a tie-down, anchor point, and/or attachment point for heavy loads and/or shipping of articles.
Figure 4A:
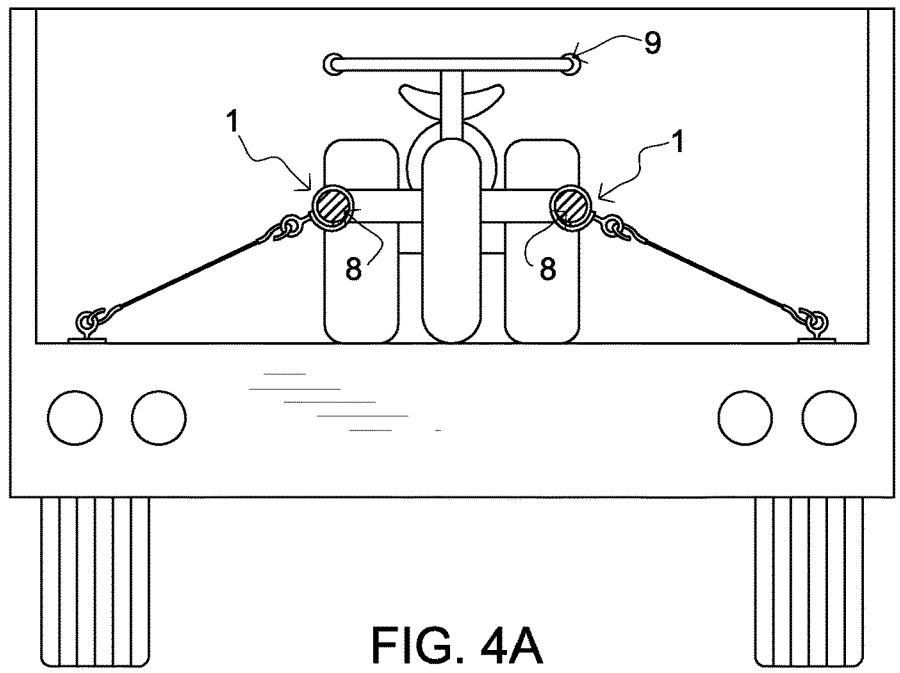
FIG. 4A depicts one embodiment of the practical application of multiple improved tie-down-wrap devices, featuring eye-type load-tie-down members, to secure a load in the back of a truck bed.
Figure 4B:
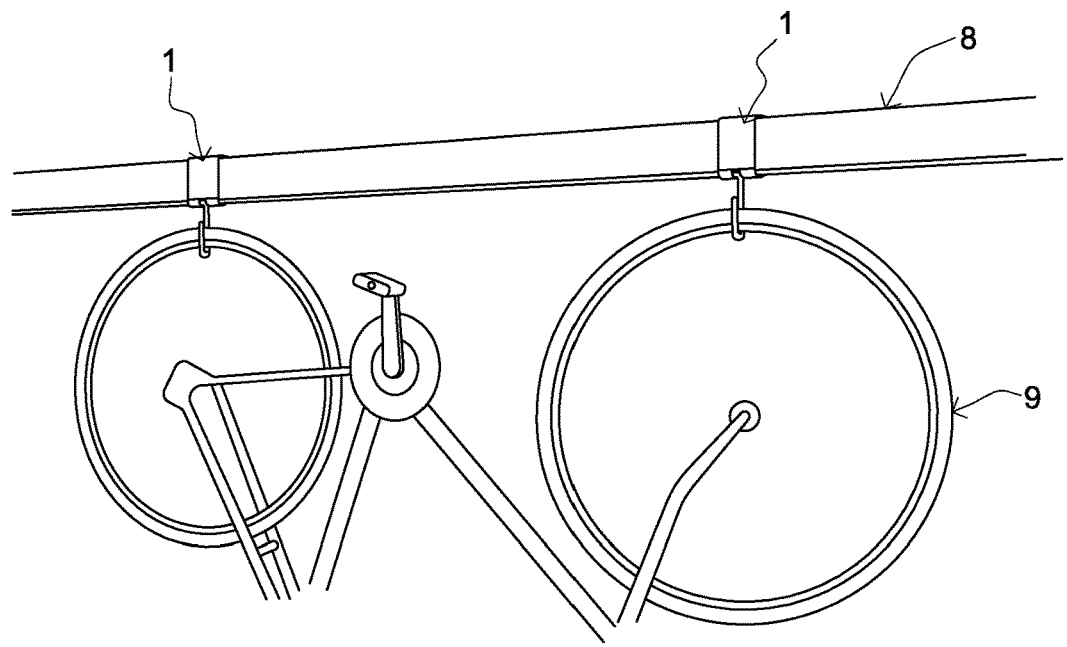
FIG. 4B depicts one embodiment of the practical application of multiple improved tie-down-wrap devices, featuring hook-type load-tie-down members, used to hang/store a bicycle from a ceiling beam.

Refer to FIGS. 1A-1E; 2A-2B; 3A-3B; and 4A-4B. In an embodiment, the tie-down-wrap device 1 is comprised of a first primary load-bearing substrate and a second primary load-bearing substrate 2A, 2B, substantially parallel to one another, wherein each primary load-bearing substrate 2A, 2B is of equal predetermined length and width with respect to one another. Each primary load-bearing substrate 2A, 2B has a first end and a second end, and an interior side and an exterior side. At the first end of each primary load-bearing substrate 2A, 2B, the substrate is folded back on and secured to itself in order to form a load-tie-down member securement loop 4A, 4B.

Moreover, in an embodiment, the tie-down-wrap device 1 is also comprised of a first coupling substrate and a second coupling substrate 6A, 6B, adapted to detachably couple with each other (in many variations, by way of a hook-and-loop coupling scheme, which is a preferred scheme, though other coupling means, such as a system of mechanical snaps, can be used), each of a predetermined width that generally corresponds to the combined width of the first and second primary load-bearing substrates 2A, 2B plus the space between the first and second primary load-bearing substrates 2A, 2B, and each of a predetermined length that corresponds to less than half and more than 20% of the length of either of the first and second primary load-bearing substrates 2A, 2B, the first coupling substrate 6A disposed on and fixedly coupled to the exterior side and toward the first ends of the first and second primary load-bearing substrates 2A, 2B, and the second coupling substrate 6B disposed on and fixedly coupled to the interior side and toward the second ends of the first and second primary load-bearing substrates 2A, 2B.

In addition, the embodiments include a load-tie-down member 5 having a connector-receiving-cavity end 5A, a neck section 5B, and two anchor flanges 5C, with the neck section 5B disposed between the receiving cavity 5A and the anchor flanges 5C, wherein each of the connector member's 5 anchor flanges 5C are removably disposed in one of the connector-anchor securement loops 4A, 4B, allowing the connector member neck 5B and receiving cavity 5A to extend between the connector-anchor securement loops 4A, 4B and to detachably and pivotably couple with the connector-anchor securement loops 4A, 4B. In many variations, an open longitudinal space is bounded by the first and second primary load-bearing substrates 2A, 2B and the first and second coupling substrates 6A, 6B, and the load-tie-down member's 5 neck 5B and connector-receiving cavity end 5A extend through the open longitudinal space when said tie-down-wrap device 1 is wrapped around and secured to a user-selected load-anchor point 8.

In many variations, the improved tie-down-wrap device 1 further comprises at least one first-end reinforcing, non-slip, substrate 7A of a predetermined width that generally corresponds to the combined width of the first and second primary load-bearing substrates 2A, 2B plus the space between said first and second primary load-bearing substrates 2A, 2B, and of a predetermined length that corresponds to less than half and 20% or more of the length of either of the first and second primary load-bearing substrates 2A, 2B. In these variations, the at least one first-end reinforcing substrate 7A disposed on the interior side and toward the first ends of the first and second primary load-bearing substrates 2A, 2B. Additionally, the at least one first-end reinforcing, non-slip, substrate 7A, the first and second primary load-bearing substrates 2A, 2B, and the first coupling substrate 6A are fixedly coupled to each other.

In still more variations, the improved tie-down-wrap device 1 further comprises at least one second-end reinforcing substrate 7B of a predetermined width that generally corresponds to the combined width of the first and second primary load-bearing substrates 2A, 2B plus the space between the first and second primary load-bearing substrates 2A, 2B, and of a predetermined length that corresponds to less than half, and 20% or more, of the length of either of the first and second primary load-bearing substrates 2A, 2B, wherein the at least one second-end reinforcing substrate 7B is disposed on the exterior side and toward the second ends of the first and second primary load-bearing substrates 2A, 2B, and the second reinforcing substrate 7B, the first and second primary load-bearing substrates 2A, 2B, and the second coupling substrate 6B are fixedly coupled to each other.

In some embodiments, the improved tie-down-wrap device 1 further comprises a redundant safety securement loop 3 for a load-tie-down member 5, formed with a substrate having a first end and a second end fixedly attached to and spanning across the first and second primary load-bearing substrates 2A, 2B. The aforementioned open longitudinal space is positioned to correspond to the opening of the redundant safety securement loop 3 for a load-tie-down member 5. This, in turn, allows the load-tie-down member's neck 5B and connector-receiving cavity end 5A to extend through both the redundant safety securement loop 3 for a load-tie-down member 5 and the open longitudinal space when the tie-down-wrap device 1 is wrapped around and secured to a user-selected load-anchor point 8. This scheme allows for a backup means to hold the load-tie-down member 5 in place should the first and second coupling substrates 6A, 6B become uncoupled (e.g., the hook-and-loop surfaces become fouled with dirt and debris and vibrate apart to start the partial unwrapping of the tie-down-wrap device 1).

The materials used for the various substrates can vary according to the projected loads expected to be realized by the tie-down-wrap device 1. Those skilled in the art will appreciate that versions of the tie-down-wrap device 1 that are adapted for lighter-duty uses can employ less-strong and/or less-expensive materials, and vice-versa for heavy-duty loads. In some embodiments, each of the load-bearing substrates 2A, 2B are substantially comprised of one or more materials selected from the group consisting of nylon, polyester, polypropylene, polyurethane, jute, and cotton. In variations, the at least one first-end reinforcing, non-slip, substrate 7A is substantially comprised of one or more materials selected from the group consisting of thermal-polyurethane-coated fabric, neoprene-coated fabric, rubber-coated fabric, and polyvinyl-chloride (PVC) coated fabric. In still more variations, those coated fabrics are further comprised of a material selected from the group consisting of polyester, polyurethane, and cotton. In some cases for the at least one second-end reinforcing substrates 7B, they are comprised of fabric that is substantially comprised of one or more materials selected from the group consisting of nylon, cotton, polyester, and polyurethane. In other embodiments, the redundant safety securement loop 3 is substantially comprised of one or more materials selected from the group consisting of nylon, polyester, polypropylene, polyurethane, jute, and cotton.

In even more embodiments, the first and second primary load-bearing substrates 2A, 2B are formed from a single, continuous strap of webbing. Similarly, in other variations, the redundant safety securement loop 3 for a load-tie-down member 5 is formed from the same single, continuous strap of webbing as is used to form said first and second primary load-bearing substrates 2A, 2B.

In many embodiments, the load-tie-down member 5 is substantially comprised of a high-strength material selected from the group consisting of high-tensile-strength stainless steel, alloy steel, high-carbon steel, and carbon-fiber composite. In variations, the load-tie-down member's 5 connector-receiving-cavity end 5A configuration is selected from the group consisting of eye-loop style and hook style. Of course, other connector styles are possible, including various types of carabiners, snap hooks, clip hooks, and the like. In still more variations, the tie-down member's 5 neck 5B includes an axial swivel capability between the anchor flanges 5C and the connector-receiving cavity 5A, which in turn makes the tie-down-wrap device 1 more adaptable to differing angles relative to a secured load.

In still more embodiments, the aforementioned fixed coupling of substrates together is accomplished by the use of heavy-duty stitching using thread material selected from the group consisting of bonded nylon thread, bonded polyester thread, and para-aramid synthetic fiber. In variations, adhesives may also be applied between fixedly coupled substrates.

The improved tie-down-wrap device 1 can be made/scaled in size to suit a variety of applications of varying load capacities. In some example embodiments, the improved tie-down-wrap device 1 is made according to the following non-limiting specifications:

| Example Size and Capacity Specifications for An Improved Tie-Down-Wrap Device for Heavy-Duty Applications | | | | | | |
| --- | --- | --- | --- | --- | --- | --- |
| Size | SS | SM | SL | M | LS | LL |
| Working Load (lbs.) | 1000 | 1050 | 1100 | 1250 | 1300 | 1350 |
| Breaking Strength (lbs.) | 3000 | 3200 | 3350 | 3800 | 4000 | 4100 |
| Diameter of Object to Be Attached To (in.) | ½-⅞ | 1.0-1.5 | 1.5-2.0 | 1.5-2.0 | 2.0-2.5 | 2.5-3.0 |

| Example Size and Capacity Specifications for An Improved Tie-Down-Wrap Device for Light-Duty Applications | | | |
| --- | --- | --- | --- |
| Size | SMH | SLH | LLH |
| Working Load (lbs.) | 100 | 100 | 150 |
| Breaking Strength (lbs.) | 300 | 300 | 450 |
| Diameter of Object to Be Attached To (in.) | 1.0-1.5 | 1.5-2.0 | 2.5-3.0 |

IV. A Method of Making an Improved Tie-Down-Wrap Device for Load Handling and/or Securement This Section IV is generally directed to embodiments of a method for making an improved tie-down-wrap device for use as a tie-down, anchor point, and/or attachment point for loads and/or shipping of articles. In many embodiments, the device is especially adapted for heavy-load applications.

Refer to FIGS. 1A-1E; 2A-2B; 3A-3B; and 4A-4B. In an embodiment, the method comprises the steps of:

Providing a first primary load-bearing substrate and a second primary load-bearing substrate 2A, 2B, substantially parallel to one another, wherein each primary load-bearing substrate 2A, 2B is of equal predetermined length and width with respect to one another.

Each primary load-bearing substrate 2A, 2B has a first end and a second end, and an interior side and an exterior side. At the first end of each primary load-bearing substrate 2A, 2B, the substrate is folded back on and secured to itself in order to form a load-tie-down member securement loop 4A, 4B;

Providing a first coupling substrate and a second coupling substrate 6A, 6B, adapted to detachably couple with each other (in many variations, by way of a hook-and-loop coupling scheme, which is a preferred scheme, though other coupling means, such as a system of mechanical snaps, can be used), each of a predetermined width that generally corresponds to the combined width of the first and second primary load-bearing substrates 2A, 2B plus the space between the first and second primary load-bearing substrates 2A, 2B, and each of a predetermined length that corresponds to less than half and more than 20% of the length of either of the first and second primary load-bearing substrates 2A, 2B, the first coupling substrate 6A disposed on and fixedly coupled to the exterior side and toward the first ends of the first and second primary load-bearing substrates 2A, 2B, and the second coupling substrate 6B disposed on and fixedly coupled to the interior side and toward the second ends of the first and second primary load-bearing substrates 2A, 2B;

Providing a load-tie-down member 5 having a connector-receiving-cavity end 5A, a neck section 5B, and two anchor flanges 5C, with the neck section 5B disposed between the receiving cavity 5A and the anchor flanges 5C, wherein each of the connector member's 5 anchor flanges 5C are removably disposed in one of the connector-anchor securement loops 4A, 4B, allowing the connector member neck 5B and receiving cavity 5A to extend between the connector-anchor securement loops 4A, 4B and to detachably and pivotably couple with the connector-anchor securement loops 4A, 4B. In many variations, an open longitudinal space is bounded by the first and second primary load-bearing substrates 2A, 2B and the first and second coupling substrates 6A, 6B, and the load-tie-down member's 5 neck 5B and connector-receiving cavity end 5A extend through the open longitudinal space when said tie-down-wrap device 1 is wrapped around and secured to a user-selected load-anchor point 8;

Providing at least one first-end reinforcing, non-slip, substrate 7A of a predetermined width that generally corresponds to the combined width of the first and second primary load-bearing substrates 2A, 2B plus the space between said first and second primary load-bearing substrates 2A, 2B, and of a predetermined length that corresponds to less than half and 20% or more of the length of either of the first and second primary load-bearing substrates 2A, 2B. In these variations, the at least one first-end reinforcing substrate 7A disposed on the interior side and toward the first ends of the first and second primary load-bearing substrates 2A, 2B. Additionally, the at least one first-end reinforcing, non-slip, substrate 7A, the first and second primary load-bearing substrates 2A, 2B, and the first coupling substrate 6A are fixedly coupled to each other;

Providing at least one second-end reinforcing substrate 7B of a predetermined width that generally corresponds to the combined width of the first and second primary load-bearing substrates 2A, 2B plus the space between the first and second primary load-bearing substrates 2A, 2B, and of a predetermined length that corresponds to less than half, and 20% or more, of the length of either of the first and second primary load-bearing substrates 2A, 2B, wherein the at least one second-end reinforcing substrate 7B is disposed on the exterior side and toward the second ends of the first and second primary load-bearing substrates 2A, 2B, and the second reinforcing substrate 7B, the first and second primary load-bearing substrates 2A, 2B, and the second coupling substrate 6B are fixedly coupled to each other; and Providing a redundant safety securement loop 3 for a load-tie-down member 5, formed with a substrate having a first end and a second end fixedly attached to and spanning across the first and second primary load-bearing substrates 2A, 2B. The aforementioned open longitudinal space is positioned to correspond to the opening of the redundant safety securement loop 3 for a load-tie-down member 5. This, in turn, allows the load-tie-down member's neck 5B and connector-receiving cavity end 5A to extend through both the redundant safety securement loop 3 for a load-tie-down member 5 and the open longitudinal space when the tie-down-wrap device 1 is wrapped around and secured to a user-selected load-anchor point 8. This scheme allows for a backup means to hold the load-tie-down member 5 in place should the first and second coupling substrates 6A, 6B become uncoupled (e.g., the hook-and-loop surfaces become fouled with dirt and debris and vibrate apart to start the partial unwrapping of the tie-down-wrap device 1);

Embodiments of the method of making can be varied with the selection of materials to make the improved tie-down-wrap device 1. The method materials used for the various substrates can vary according to the projected loads expected to be realized by the tie-down-wrap device 1. Those skilled in the art will appreciate that versions of the tie-down-wrap device 1 that are adapted for lighter-duty uses can employ less-strong and/or less-expensive materials, and vice-versa for heavy-duty loads. In some embodiments, each of the load-bearing substrates 2A, 2B are substantially comprised of one or more materials selected from the group consisting of nylon, polyester, polypropylene, polyurethane, jute, and cotton. In variations, the at least one first-end reinforcing, non-slip, substrate 7A is substantially comprised of one or more materials selected from the group consisting of thermal-polyurethane-coated fabric, neoprene-coated fabric, rubber-coated fabric, and polyvinyl-chloride (PVC) coated fabric. In still more variations, those coated fabrics are further comprised of a material selected from the group consisting of polyester, polyurethane, and cotton. In some cases for the at least one second-end reinforcing substrates 7B, they are comprised of fabric that is substantially comprised of one or more materials selected from the group consisting of nylon, cotton, polyester, and polyurethane. In other embodiments, the redundant safety securement loop 3 is substantially comprised of one or more materials selected from the group consisting of nylon, polyester, polypropylene, polyurethane, jute, and cotton.

In even more embodiments, the first and second primary load-bearing substrates 2A, 2B are formed from a single, continuous strap of webbing. Similarly, in other variations, the redundant safety securement loop 3 for a load-tie-down member 5 is formed from the same single, continuous strap of webbing as is used to form said first and second primary load-bearing substrates 2A, 2B.

In many embodiments, the load-tie-down member 5 is substantially comprised of a high-strength material selected from the group consisting of high-tensile-strength stainless steel, alloy steel, high-carbon steel, and carbon-fiber composite. In variations, the load-tie-down member's 5 connector-receiving-cavity end 5A configuration is selected from the group consisting of eye-loop style and hook style. Of course, other connector styles are possible, including various types of carabiners, snap hooks, clip hooks, and the like. In still more variations, the tie-down member's 5 neck 5B includes an axial swivel capability between the anchor flanges 5C and the connector-receiving cavity 5A, which in turn makes the tie-down-wrap device 1 more adaptable to differing angles relative to a secured load.

In still more variations, the aforementioned fixed coupling of substrates together is accomplished by the use of heavy-duty stitching using thread material selected from the group consisting of bonded nylon thread, bonded polyester thread, and para-aramid synthetic fiber. In variations, adhesives may also be applied between fixedly coupled substrates.

The improved tie-down-wrap device 1 can be made/scaled in size to suit a variety of applications of varying load capacities. In some example embodiments, the improved tie-down-wrap device 1 is made according to the following non-limiting specifications:

| Example Size and Capacity Specifications for An Improved Tie-Down-Wrap Device for Heavy-Duty Applications | | | | | | |
|---|---|---|---|---|---|---|
| Size | SS | SM | SL | M | LS | LL |
| Working Load (lbs.) | 1000 | 1050 | 1100 | 1250 | 1300 | 1350 |
| Breaking Strength (lbs.) | 3000 | 3200 | 3350 | 3800 | 4000 | 4100 |
| Diameter of Object to Be Attached To (in.) | ½-⅞ | 1.0-1.5 | 1.5-2.0 | 1.5-2.0 | 2.0-2.5 | 2.5-3.0 |

| Example Size and Capacity Specifications for An Improved Tie-Down-Wrap Device for Light-Duty Applications | | | |
|---|---|---|---|
| Size | SMH | SLH | LLH |
| Working Load (lbs.) | 100 | 100 | 150 |
| Breaking Strength (lbs.) | 300 | 300 | 450 |
| Diameter of Object to Be Attached To (in.) | 1.0-1.5 | 1.5-2.0 | 2.5-3.0 |

V. Methods of Using an Improved Tie-Down-Wrap Device for Load Handling and/or Securement This Section V is generally directed to a methods-of-use for embodiments of an improved tie-down-wrap device for use as a tie-down, anchor point, and/or attachment point for loads and/or shipping of articles. In many embodiments, the device is especially adapted for heavy-load applications.

Refer to FIGS. 1A-1E; 2A-2B; 3A-3B; and 4A-4B. In an embodiment, the method comprises the steps of:

By a user, identifying a load 9 to secure into position for shipping and/or storage;

By a user, obtaining one or more an improved tie-down-wrap devices 1 according to Section III, supra;

By a user, identifying one or more attachment points on the load 9, said attachment point(s) securely attached to the load 9 and having a fixed member 8 around which the tie-down-wrap device 1 can be wrapped and detachably coupled;

By a user, identifying one or more anchor points to which to secure the load 9, said anchor point(s) being securely attached to the target load-storage space and having a fixed member 8 around which the tie-down-wrap device 1 can be wrapped and detachably coupled;

By a user, selecting at least one appropriately sized improved tie-down-wrap device 1 consistent with the anticipated load/weight to be experienced by the at least one improved tie-down-wrap device 1;

By a user, applying the interior, non-slip side of at least one improved tie-down-wrap device 1 against the surface of a user-selected load 9 attachment point and wrapping the improved tie-down-wrap device 1 around the attachment point's fixed member 8 such that the load-tie-down member's 5 connector-receiving-cavity end 5A configuration extends through the redundant safety securement loop 3 and through the longitudinal open space between the first and second primary load-bearing substrates 2A, 2B, and continuing to wrap the second end of the improved tie-down-wrap device 1 until the first and second coupling substrates are detachably coupled to one another;

By a user, applying the interior, non-slip side of at least one improved tie-down-wrap device 1 against the surface of a user-selected anchor point that is securely attached to the target load-storage space, and wrapping the improved tie-down-wrap device 1 around the anchor point's fixed member 8 such that the load-tie-down member's 5 connector-receiving-cavity end 5A configuration extends through the redundant safety securement loop 3 and through the longitudinal open space between the first and second primary load-bearing substrates 2A, 2B, and continuing to wrap the second end of the improved tie-down-wrap device 1 until the first and second coupling substrates are detachably coupled to one another;

By a user, securing the position of any attachment point(s) that the user has installed an improved tie-down-wrap device 1 by coupling the attachment point(s) to one or more user-selected anchor points at which the user has installed an improved tie-down-wrap device 1 with a tie-down member selected from the group consisting of bungee cords, tie down straps, lanyards, ropes, netting, webbing straps, and chains, then tightening said tie-down member(s).

In variations, the above method steps need not include an improved tie-down-wrap device 1 at each said attachment point, if any at all, nor at each said anchor point, if any at all, so long as at least one improved tie-down-wrap device 1 is used to secure the load 9.

VI. Alternative Embodiments and Other Variations

The various embodiments and variations thereof described herein, including the appended Claims and/or illustrated in the accompanying Figures are merely exemplary and are not meant to limit the scope of the inventive disclosure. It should be appreciated that numerous variations of the invention have been contemplated as would be obvious to one of ordinary skill in the art with the benefit of this disclosure.

Hence, those ordinarily skilled in the art will have no difficulty devising myriad obvious variations and improvements to the invention, all of which are intended to be encompassed within the scope of the Description, Claims, and Figures herein.

What is claimed is:

1. An improved tie-down-wrap device for use as a tie-down, anchor point, and/or attachment point for heavy loads and/or shipping of articles, comprising:

a first primary load-bearing substrate and a second primary load-bearing substrate, substantially parallel to one another and having a longitudinal space disposed between them, each of equal predetermined length and width, and each having a first end and a second end, and an interior side and an exterior side, wherein each said primary load-bearing substrate is folded back on and secured to itself on its respective first end to form a load-tie-down member securement loop;

a first coupling substrate and a second coupling substrate, adapted to detachably couple with each other, each of a predetermined width that generally corresponds to the combined width of said first and second primary load-bearing substrates plus the space between said first and second primary load-bearing substrates, and each of a predetermined length that corresponds to less than half and 20% or more of the length of either of said first and second primary load-bearing substrates, said first coupling substrate disposed on and fixedly coupled to the exterior side and toward the first ends of said first and second primary load-bearing substrates, and said second coupling substrate disposed on and fixedly coupled to the interior side and toward the second ends of said first and second primary load-bearing substrates; and a load-tie-down member having a connector-receiving-cavity end, a neck section, and two anchor flanges, said neck section disposed between said receiving cavity and said anchor flanges, wherein each of said connector member's anchor flanges are disposed in one of said connector-anchor securement loops, allowing said connector member neck and receiving cavity to extend between said connector-anchor securement loops and to detachably and pivotably couple with said connector-anchor securement loops, wherein:

an open longitudinal space is bounded by said first and second primary load-bearing substrates and said first and second coupling substrates, and said load-tie-down member's neck and connector-receiving cavity end extend through said open longitudinal space when said tie-down-wrap device is wrapped around and secured to a user-selected load-anchor point.

2. The improved tie-down-wrap device of claim 1, further comprising at least one first-end reinforcing, non-slip, substrate of a predetermined width that generally corresponds to the combined width of said first and second primary load-bearing substrates plus the space between said first and second primary load-bearing substrates, and of a predetermined length that corresponds to less than half and 20% or more of the length of either of said first and second primary load-bearing substrates, wherein:
  said at least one first-end reinforcing substrate is disposed on the interior side and toward the first ends of said first and second primary load-bearing substrates, and
  said at least one first-end reinforcing, non-slip, substrate, said first and second primary load-bearing substrates, and said first coupling substrate are fixedly coupled to each other.

3. The improved tie-down-wrap device of claim 1, further comprising at least one second-end reinforcing substrate of a predetermined width that generally corresponds to the combined width of said first and second primary load-bearing substrates plus the space between said first and second primary load-bearing substrates, and of a predetermined length that corresponds to less than half and 20% or more of the length of either of said first and second primary load-bearing substrates, wherein:
  said at least one second-end reinforcing substrate is disposed on the exterior side and toward the second ends of said first and second primary load-bearing substrates, and
  said second reinforcing substrate, said first and second primary load-bearing substrates, and said second coupling substrate are fixedly coupled to each other.

4. The improved tie-down-wrap device of claim 1, further comprising a redundant safety securement loop for a load-tie-down member, formed with a substrate having a first end and a second end fixedly attached to and spanning across said first and second primary load-bearing substrates, wherein:
  said open longitudinal space is positioned to correspond to the opening of said redundant safety securement loop for a load-tie-down member, and
  said load-tie-down member's neck and connector-receiving cavity end extends through both said redundant safety securement loop for a load-tie-down member and said open longitudinal space when said tie-down-wrap device is wrapped around and secured to a user-selected load-anchor point.

5. The improved tie-down-wrap device of claim 1, wherein said first coupling substrate and said second coupling substrate are adapted to detachably couple with each other using a coupling scheme selected from the group consisting of hook-and-loop coupling and coupling by way of one or more mechanical snaps.

6. The improved tie-down-wrap device of claim 1, wherein each of said load-bearing substrates are substantially comprised of one or more materials selected from the group consisting of nylon, polyester, polypropylene, polyurethane, jute, and cotton.

7. The improved tie-down-wrap device of claim 2, wherein said at least one first-end reinforcing, non-slip, substrate is substantially comprised of one or more materials selected from the group consisting of thermal-polyurethane-coated fabric, neoprene-coated fabric, rubber-coated fabric, and polyvinyl-chloride (PVC) coated fabric.

8. The improved tie-down-wrap device of claim 7, wherein said at least one first-end reinforcing, non-slip, substrate's coated fabric is comprised of a material selected from the group consisting of polyester, polyurethane, and cotton.

9. The improved tie-down-wrap device of claim 3, wherein said at least one second-end reinforcing substrate is comprised of fabric that is substantially comprised of one or more materials selected from the group consisting of nylon, cotton, polyester, and polyurethane.

10. The improved tie-down-wrap device of claim 4, wherein said redundant safety securement loop is substantially comprised of one or more materials selected from the group consisting of nylon, polyester, polypropylene, polyurethane, jute, and cotton.

11. The improved tie-down-wrap device of claim 1, wherein said first and second primary load-bearing substrates are formed from a single, continuous strap of webbing.

12. The improved tie-down-wrap device of claim 11, wherein said redundant safety securement loop for a load-tie-down member is formed from the same single, continuous strap of webbing as is used to form said first and second primary load-bearing substrates.

13. The improved tie-down-wrap device of claim 1, wherein said load-tie-down member is substantially comprised of a high-strength material selected from the group consisting of high-tensile-strength stainless steel, alloy steel, high-carbon steel, and carbon-fiber composite.

14. The improved tie-down-wrap device of claim 1, wherein said load-tie-down member's connector-receiving-cavity end configuration is selected from the group consisting of eye-loop style, hook style, carabiner, snap hooks, and clip hooks.

15. The improved tie-down-wrap device of claim 1, wherein said load-tie-down member's neck section includes an axial swivel capability between said anchor flanges and said connector-receiving cavity.

16. The improved tie-down-wrap device of claim 1, wherein the stated fixed coupling of substrates uses heavy-duty stitching using thread material selected from the group consisting of bonded nylon thread, bonded polyester thread, and para-aramid synthetic fiber.

17. A method of making an improved tie-down-wrap device for use as a tie-down, anchor point, and/or attachment point for heavy loads and/or shipping of articles, the method comprising the steps of:
  providing a first primary load-bearing substrate and a second primary load-bearing substrate, substantially parallel to one another and having a longitudinal space disposed between them, each of equal predetermined length and width, and each having a first end and a second end, and an interior side and an exterior side, wherein each said primary load-bearing substrate is folded back on and secured to itself on its respective first end to form a load-tie-down member securement loop;
  providing a first coupling substrate and a second coupling substrate, adapted to detachably couple with each other, each of a predetermined width that generally corresponds to the combined width of said first and second primary load-bearing substrates plus the space between said first and second primary load-bearing substrates, and each of a predetermined length that corresponds to less than half and 20% or more of the length of either of said first and second primary load-bearing substrates, said first coupling substrate disposed on and fixedly coupled to the exterior side and toward the first ends of said first and second primary load-bearing substrates, and said second coupling substrate disposed on and fixedly coupled to the interior side and toward the second ends of said first and second primary load-bearing substrates; and providing a load-tie-down member having a connector-receiving-cavity end, a neck section, and two anchor flanges, said neck section disposed between said receiving cavity and said anchor flanges, wherein each of said connector member's anchor flanges are disposed in one of said connector-anchor securement loops, allowing said connector member neck and receiving cavity to extend between said connector-anchor securement loops and to detachably and pivotably couple with said connector-anchor securement loops, wherein:

an open longitudinal space is bounded by said first and second primary load-bearing substrates and said first and second coupling substrates, and said load-tie-down member's neck and connector-receiving cavity end extend through said open longitudinal space when said tie-down-wrap device is wrapped around and secured to a user-selected load-anchor point.

18. The method of claim 17, further comprising the step of providing at least one first-end reinforcing, non-slip, substrate of a predetermined width that generally corresponds to the combined width of said first and second primary load-bearing substrates plus the space between said first and second primary load-bearing substrates, and of a predetermined length that corresponds to less than half and 20% or more of the length of either of said first and second primary load-bearing substrates, wherein:

said at least one first-end reinforcing substrate is disposed on the interior side and toward the first ends of said first and second primary load-bearing substrates, and said at least one first-end reinforcing, non-slip, substrate, said first and second primary load-bearing substrates, and said first coupling substrate are fixedly coupled to each other.

19. The method of claim 17, further comprising the step of providing at least one second-end reinforcing substrate of a predetermined width that generally corresponds to the combined width of said first and second primary load-bearing substrates plus the space between said first and second primary load-bearing substrates, and of a predetermined length that corresponds to less than half and 20% or more of the length of either of said first and second primary load-bearing substrates, wherein:

said at least one second-end reinforcing substrate is disposed on the exterior side and toward the second ends of said first and second primary load-bearing substrates, and said second reinforcing substrate, said first and second primary load-bearing substrates, and said second coupling substrate are fixedly coupled to each other.

20. The method of claim 17, further comprising the step of providing a redundant safety securement loop for a load-tie-down member, formed with a substrate having a first end and a second end fixedly attached to and spanning across said first and second primary load-bearing substrates, wherein:

said open longitudinal space is positioned to correspond to the opening of said redundant safety securement loop for a load-tie-down member, and said load-tie-down member's neck and connector-receiving cavity end extends through both said redundant safety securement loop for a load-tie-down member and said open longitudinal space when said tie-down-wrap device is wrapped around and secured to a user-selected load-anchor point.

21. The method of claim 17, wherein said first coupling substrate and said second coupling substrate are adapted to detachably couple with each other using a coupling scheme selected from the group consisting of hook-and-loop coupling and coupling by way of one or more mechanical snaps.

22. The method of claim 17, wherein each of said load-bearing substrates are substantially comprised of one or more materials selected from the group consisting of nylon, polyester, polypropylene, polyurethane, jute, and cotton.

23. The method of claim 18, wherein said at least one first-end reinforcing, non-slip, substrate is substantially comprised of one or more materials selected from the group consisting of thermal-polyurethane-coated fabric, neoprene-coated fabric, rubber-coated fabric, and polyvinyl-chloride (PVC) coated fabric.

24. The method of claim 23, wherein said at least one first-end reinforcing, non-slip, substrate's coated fabric is comprised of a material selected from the group consisting of polyester, polyurethane, and cotton.

25. The method of claim 19, wherein said at least one second-end reinforcing substrate is comprised of fabric that is substantially comprised of one or more materials selected from the group consisting of nylon, cotton, polyester, and polyurethane.

26. The method of claim 20, wherein said redundant safety securement loop is substantially comprised of one or more materials selected from the group consisting of nylon, polyester, polypropylene, polyurethane, jute, and cotton.

27. The method of claim 17, wherein said first and second primary load-bearing substrates are formed from a single, continuous strap of webbing.

28. The method of claim 27, wherein said redundant safety securement loop for a load-tie-down member is formed from the same single, continuous strap of webbing as is used to form said first and second primary load-bearing substrates.

29. The method of claim 17, wherein said load-tie-down member is substantially comprised of a high-strength material selected from the group consisting of high-tensile-strength stainless steel, alloy steel, high-carbon steel, and carbon-fiber composite.

30. The method of claim 17, wherein said load-tie-down member's connector-receiving-cavity end configuration is selected from the group consisting of eye-loop style, hook style, carabiner, snap hooks, and clip hooks.

31. The method of claim 17, wherein said load-tie-down member's neck section includes an axial swivel capability between said anchor flanges and said connector-receiving cavity.

32. The method of claim 17, wherein the stated fixed coupling of substrates uses heavy-duty stitching using thread material selected from the group consisting of bonded nylon thread, bonded polyester thread, and para-aramid synthetic fiber.

33. A method of using an improved tie-down-wrap device for use as a tie-down, anchor point, and/or attachment point for heavy loads and/or shipping of articles, the method comprising the steps of:

by a user, identifying a load to secure into position for shipping and/or storage;

by a user, obtaining one or more improved tie-down-wrap devices, each said device comprised of:

a first primary load-bearing substrate and a second primary load-bearing substrate, substantially parallel to one another and having a longitudinal space disposed between them, each of equal predetermined length and width, and each having a first end and a second end, and an interior side and an exterior side, wherein each said primary load-bearing substrate is folded back on and secured to itself on its respective first end to form a load-tie-down member securement loop;

a first coupling substrate and a second coupling substrate, adapted to detachably couple with each other, each of a predetermined width that generally corresponds to the combined width of said first and second primary load-bearing substrates plus the space between said first and second primary load-bearing substrates, and each of a predetermined length that corresponds to less than half and 20% or more of the length of either of said first and second primary load-bearing substrates, said first coupling substrate disposed on and fixedly coupled to the exterior side and toward the first ends of said first and second primary load-bearing substrates, and said second coupling substrate disposed on and fixedly coupled to the interior side and toward the second ends of said first and second primary load-bearing substrates; and a load-tie-down member having a connector-receiving-cavity end, a neck section, and two anchor flanges, said neck section disposed between said receiving cavity and said anchor flanges, wherein each of said connector member's anchor flanges are disposed in one of said connector-anchor securement loops, allowing said connector member neck and receiving cavity to extend between said connector-anchor securement loops and to detachably and pivotably couple with said connector-anchor securement loops, wherein:

an open longitudinal space is bounded by said first and second primary load-bearing substrates and said first and second coupling substrates, and said load-tie-down member's neck and connector-receiving cavity end extend through said open longitudinal space when said tie-down-wrap device is wrapped around and secured to a user-selected load-anchor point;

by a user, identifying one or more attachment points on said load, said attachment point(s) securely attached to said load and having a fixed member around which said at least one tie-down-wrap device can be wrapped and detachably coupled;

by a user, identifying one or more anchor points to which to secure the load, said anchor point(s) being securely attached to the target load-storage space and having a fixed member around which at least one said tie-down-wrap device can be wrapped and detachably coupled;

by a user, selecting at least one appropriately sized improved tie-down-wrap device consistent with the anticipated load/weight to be experienced by said at least one tie-down-wrap device; and by a user, performing one or both of the following steps:

applying the interior side of said at least one tie-down-wrap device against the surface of a user-selected load attachment point and wrapping said tie-down-wrap device around the attachment point's fixed member such that the load-tie-down member's connector-receiving-cavity end extends through said longitudinal open space between said first and second primary load-bearing substrates, and continuing to wrap the second end of said tie-down-wrap device until said first and second coupling substrates are detachably coupled to one another; and applying the interior side of said at least one tie-down-wrap device against the surface of a user-selected anchor point that is securely attached to said target load-storage space, and wrapping the improved tie-down-wrap device around the anchor point's fixed member such that the load-tie-down member's connector-receiving-cavity end extends through said longitudinal open space between the first and second primary load-bearing substrate, and continuing to wrap the second end of said tie-down-wrap device until said first and second coupling substrates are detachably coupled to one another.

34. The method of claim 33, further comprising the steps of:

by a user, securing the position of any attachment point(s) that the user has installed at least one tie-down-wrap device by coupling said attachment point(s) to one or more user-selected anchor points with a tie-down member selected from the group consisting of bungee cords, tie down straps, lanyards, ropes, netting, webbing straps, and chains; and by a user, tightening said tie-down member(s).

35. The method of claim 33, further comprising the steps of:

by a user, securing the position of any user-selected anchor points at which the user has installed a tie-down-wrap device to one or more load-attachment point(s) with a tie-down member selected from the group consisting of bungee cords, tie down straps, lanyards, ropes, netting, webbing straps, and chains; and by a user, tightening said tie-down member(s).

36. The method of claim 33, wherein said improved tie-down-wrap devices further comprise at least one first-end reinforcing, non-slip, substrate of a predetermined width that generally corresponds to the combined width of said first and second primary load-bearing substrates plus the space between said first and second primary load-bearing substrates, and of a predetermined length that corresponds to less than half and 20% or more of the length of either of said first and second primary load-bearing substrates, wherein:

said at least one first-end reinforcing substrate is disposed on the interior side and toward the first ends of said first and second primary load-bearing substrates, and said at least one first-end reinforcing, non-slip, substrate, said first and second primary load-bearing substrates, and said first coupling substrate are fixedly coupled to each other.

37. The method of claim 33, wherein said improved tie-down-wrap devices further comprise at least one second-end reinforcing substrate of a predetermined width that generally corresponds to the combined width of said first and second primary load-bearing substrates plus the space between said first and second primary load-bearing substrates, and of a predetermined length that corresponds to less than half and 20% or more of the length of either of said first and second primary load-bearing substrates, wherein:

said at least one second-end reinforcing substrate is disposed on the exterior side and toward the second ends of said first and second primary load-bearing substrates, and said second reinforcing substrate, said first and second primary load-bearing substrates, and said second coupling substrate are fixedly coupled to each other.

38. The method of claim 33, wherein;
said improved tie-down-wrap devices further comprise a redundant safety securement loop for a load-tie-down member, formed with a substrate having a first end and a second end fixedly attached to and spanning across said first and second primary load-bearing substrates, said open longitudinal space is positioned to correspond to the opening of said redundant safety securement loop for a load-tie-down member; and
the method further comprises the step of, by a user, during the step(s) of applying the interior side of said at least one tie-down-wrap device against the surface of a user-selected load attachment point and wrapping said tie-down-wrap device around an attachment point's fixed member and/or an anchor point's fixed member, ensuring that said load-tie-down member's connector-receiving-cavity end also extends through said redundant safety securement loop.

39. The method of claim 33, wherein said first coupling substrate and said second coupling substrate are adapted to detachably couple with each other using a coupling scheme selected from the group consisting of hook-and-loop coupling and coupling by way of one or more mechanical snaps.

40. The method of claim 33, wherein each of said load-bearing substrates are substantially comprised of one or more materials selected from the group consisting of nylon, polyester, polypropylene, polyurethane, jute, and cotton.

41. The method of claim 36, wherein said at least one first-end reinforcing, non-slip, substrate is substantially comprised of one or more materials selected from the group consisting of thermal-polyurethane-coated fabric, neoprene-coated fabric, rubber-coated fabric, and polyvinyl-chloride (PVC) coated fabric.

42. The method of claim 41, wherein said at least one first-end reinforcing, non-slip, substrate's coated fabric is comprised of a material selected from the group consisting of polyester, polyurethane, and cotton.

43. The method of claim 37, wherein said at least one second-end reinforcing substrate is comprised of fabric that is substantially comprised of one or more materials selected from the group consisting of nylon, cotton, polyester, and polyurethane.

44. The method of claim 38, wherein said redundant safety securement loop is substantially comprised of one or more materials selected from the group consisting of nylon, polyester, polypropylene, polyurethane, jute, and cotton.

45. The method of claim 33, wherein said first and second primary load-bearing substrates are formed from a single, continuous strap of webbing.

46. The method of claim 38, wherein said redundant safety securement loop for a load-tie-down member is formed from the same single, continuous strap of webbing as is used to form said first and second primary load-bearing substrates.

47. The method of claim 33, wherein said load-tie-down member is substantially comprised of a high-strength material selected from the group consisting of high-tensile-strength stainless steel, alloy steel, high-carbon steel, and carbon-fiber composite.

48. The method of claim 33, wherein said load-tie-down member's connector-receiving-cavity end configuration is selected from the group consisting of eye-loop style, hook style, carabiner, snap hooks, and clip hooks.

49. The method of claim 33, wherein said load-tie-down member's neck section includes an axial swivel capability between said anchor flanges and said connector-receiving cavity.

50. The method of claim 33, wherein the stated fixed coupling of substrates uses heavy-duty stitching using thread material selected from the group consisting of bonded nylon thread, bonded polyester thread, and para-aramid synthetic fiber.

* * * * *